March 1, 1966 S. E. BORG 3,237,459
DAMPING DEVICE
Filed Oct. 2, 1961 2 Sheets-Sheet 1

INVENTOR.
S. EDWARD BORG
BY
Kenway, Jenney + Hildreth
ATTORNEYS

March 1, 1966 S. E. BORG 3,237,459
DAMPING DEVICE

Filed Oct. 2, 1961 2 Sheets-Sheet 2

INVENTOR.
S. EDWARD BORG
BY
Kenway, Jenney + Hildreth
ATTORNEYS

_United States Patent Office_ 3,237,459
Patented Mar. 1, 1966

3,237,459
DAMPING DEVICE
Sune Edward Borg, Westwood, Mass., assignor to Northrop Corporation, Beverly Hills, Calif., a corporation of California
Filed Oct. 2, 1961, Ser. No. 142,187
2 Claims. (Cl. 74—5.5)

This invention relates in general to damping devices and in particular to that class of damping devices in which damping remains constant despite temperature variations.

Damping is required in practically all precision instruments to avoid excessive oscillation of moving elements about a desired position. In most cases, such damping is relatively easily obtained by the use of dashpots or similar devices. Such practice has, in the case of gryoscopes and accelerometers, led to the utilization of vanes or blades attached to the moving element working against resistance offered by a liquid. The damping thus provided is, in general, satisfactory, but in some applications, the device being damped encounters temperatures varying from about −60° F. to over 200° F., a range of well over 200° F. Obviously, over such wide ranges of temperature, the viscosity of the damping fluid varies greatly and, with it, the resistance to vane movement. To obtain constant damping, despite these wide ranges of temperature, several expedients have been adopted to maintain unvarying damping action. One method, which has now been largely supplanted, called for thermostatic control of the damping fluid temperature by the use of heating devices. Other methods including the use of elements having different rates of expansion to vary the size of an orifice through which the damping fluid flows have also been tried. Finally, because almost all floated instruments include a bellows forming a part of the instrument housing to compensate for changes in the fluid volume with temperature change, numerous devices have been attached to the bellows to vary orifices through which the damping fluid flows. Although there are a multitude of devices of the last-mentioned type available, there are difficulties which are common to almost all such devices. Depending upon the fluid used, the viscosity may change by as much as 15 or 20 to 1, and the viscosity change is often nonlinear with respect to volume change. As a result, the volume change which initiates the orifice change to affect damping is not matched to the change in fluid viscosity, and inaccuracies result.

The primary object of the present invention is to improve the accuracy of damped instruments by closely matching the damping effect to the change in fluid volume with changes in temperature.

Another object of the present invention is to minimize the volume required to house a constant damping system for an instrument.

Still another object of the invention is to simplify the manufacture of instruments such as gyroscopes and accelerometers by the elimination of large and expensive components in a constant damping system.

Among the more important features of the present invention are a series of paddles or vanes attached to the movable element of a floated instrument which force the fluid through orifices as the movable element rotates. The orifices may be shaped in any one of a variety of geometrical shapes, and curtains are provided to mask portions of the orifices and, thereby, to reduce their effective size. Either the curtains may be made movable or the members in which the orifices are formed may be made movable in response to movement of a bellows incorporated in the housing of the instrument. In either case, the effective size of the passage through which fluid is forced by the paddles may be varied in accordance with any desired function.

These and other objects and features of the invention will be more readily understood and appreciated by a reading of the following detailed description of a preferred embodiment thereof, selected for purposes of illustration and shown in the accompanying drawings, in which.

Figure 1:
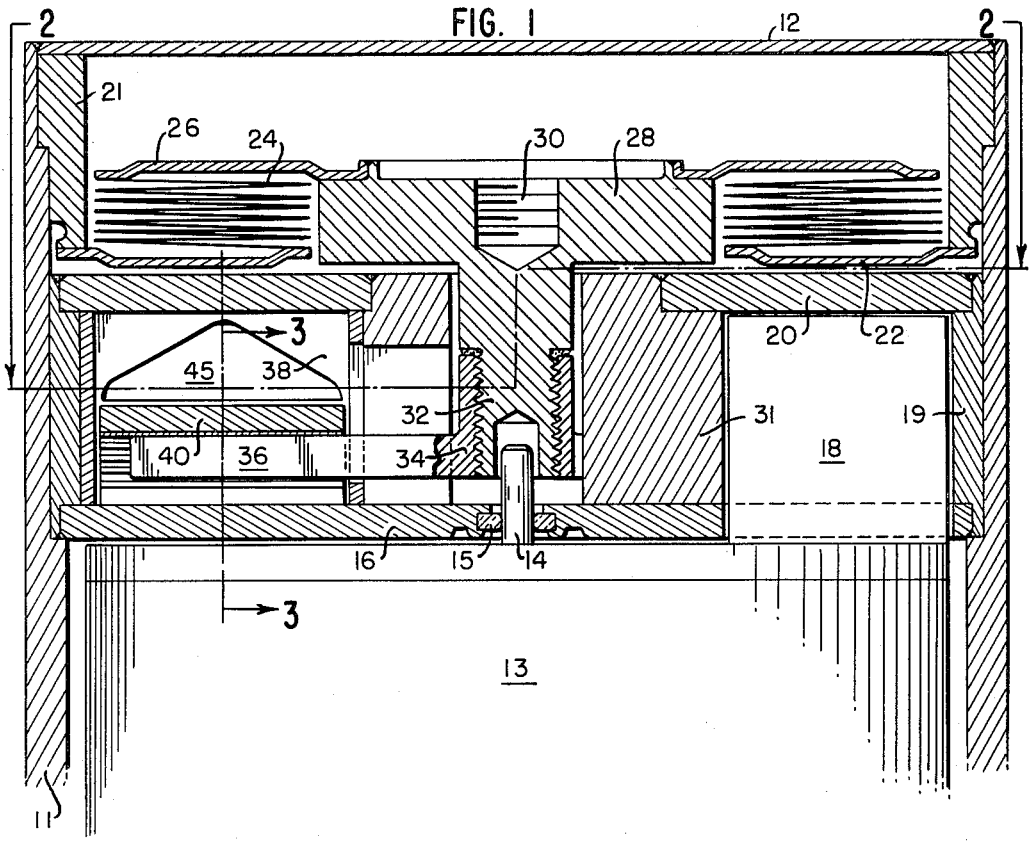
FIG. 1 is a view, partly in section and partly cutaway, of the damping device of the present invention as applied to an instrument.

The damping device shown and described herein is one which finds its primary application in connection with gyroscopes, but it is, of course, equally valuable for use in other instruments. The entire gyroscope and damping system are housed in a cylindrical metal casing 11, one end of which is closed by a flat metal disc 12, which may be held in place by any suitable means such as brazing, welding, or mechanical means. Inasmuch as the gyroscope per se forms no part of the present invention, it is merely indicated in FIG. 1 as a gimbal structure 13 mounted for rotation by means of a pivot pin 14 disposed in a jeweled bushing 15. The bushing is retained in a circular supporting web 16, which in turn is supported by an internal shoulder in the housing 11. Four symmetrically disposed radially extending wedge-shaped segments project upwardly through openings in the web. These segments serve as the vanes or paddles for the damping system and rotate with the gyroscope gimbal 13. In the view presently under discussion, only the vane 18 is visible. As is explained in greater detail below in connection with the description of FIG. 2, the vanes or paddles, of which vane 18 is typical, rotate to cause movement of a fluid which fills the entire housing 11.

Holding the web in place against the internal shoulder of the housing 11 is a shouldered sleeve 19, to the top of which is brazed or otherwise firmly attached an annular disc 20. Adjacent the upper end of the housing, as shown in FIG. 1, is a second shouldered sleeve 21, to the lower end of which is hermetically sealed a bellows lower plate 22 which is annular in shape and of relatively heavy stock. At the inner periphery of the lower plate 22, a bellows 24 made of relatively thin and flexible material is sealed. An upper bellows plate 26 constructed somewhat similarly to the lower bellows plate is also hermetically sealed to the upper and outer periphery of the bellows 24. It will be noted that the structure and method of attachment of the bellows lower plate 22 to the sleeve 21 is such that the bellows lower plate is fixed relative to the housing 11. On the other hand, the bellows upper plate 26 is free to move axially of the housing with expansion and contraction of the bellows 24.

Centrally disposed within the housing 11 and sealed to the upper bellows plate 26 is a plunger 28. A threaded opening 30 is formed in the plunger for assembly purposes, but is not important to the present discussion. The plunger 28 includes a lower reduced portion 32 which is externally threaded. Threaded onto the lower portion 32 is a spider 34 which includes four symmetrically disposed legs radiating out from the central hub portion. The leg 36 visible in this view is typical of the four legs of the spider. The reduced portion 32 of the plunger 28 has a central opening formed in its lower end to accommodate the pivot pin 14 despite axial movement of the plunger 28.

The leg 36 extends radially through a slot formed in one side of a rectangular orifice member 38. A curtain 40 is held in contact with the leg 36, as is explained in more detail below, and is disposed within the rectangular orifice member 38. The curtain is preferably fabricated from a material having a low coefficient of friction such as Teflon-impregnated powdered metal. As may be inferred from the interconnection of the various parts described above, expansion of the bellows 24 lifts the plunger 28, which in turn causes the curtains associated with the spiders to rise, blocking a portion of the orifice in the member 38. In this manner, fluid being forced through the orifice by the rotating action of paddles similar to the paddle 18 is restricted in its free movement to the extent that the orifice is blocked by the curtain.

Figure 2:
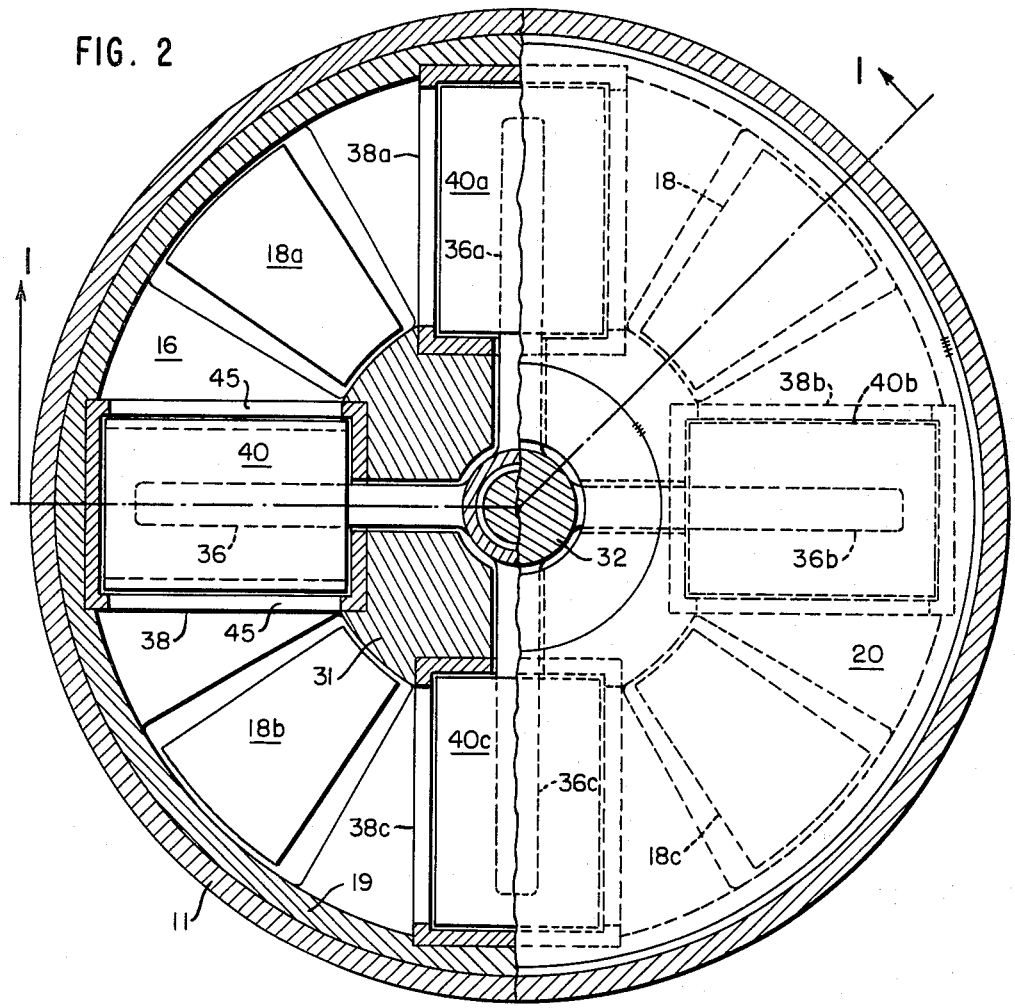
FIG. 2 is a view in cross-section taken along the lines 2—2 of FIG. 1.

In FIG. 2, some of the elements referred to above in connections with the description of FIG. 1 are more easily seen. The paddle 18, as noted, is only one of four similar paddles, the other three of which have been legened 18a, 18b and 18c. The web 16 through which the paddles project is provided with openings somewhat larger than the paddles to permit restricted rotational movement of the paddles. The circular passage which is defined by the sleeve 19, the bushing 31, the web 16 and the disc 20 is interrupted in four positions by the orifice members 38, 38a, 38b and 38c. Within the orifice members and movable axially of the device are the curtains 40, 40a, 40b and 40c, respectively. Movement of the curtains is, of course, derived from the axial movement of the legs 36, 36a, 36b and 36c, respectively, on which the curtains are held as explained below.

Figure 3:
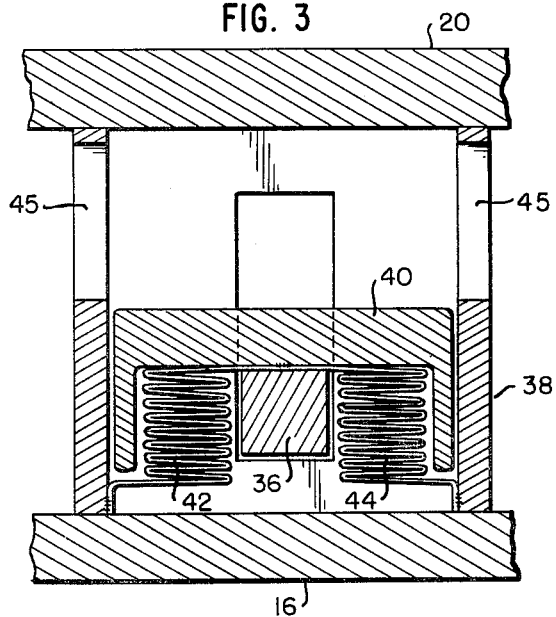
FIG. 3 is a partial section of the embodiment of FIG. 1, but in double scale.

In FIG. 3, which is a cross-section of the orifice and curtain members, some detail on their construction and the connection with the spider legs may be seen. The orifice member 38 is firmly attached to the annular disc 20, and the spider leg 36 may be seen as it penetrates the lower portion of the slot formed in the side of the orifice member 38. In this instance, the curtain takes the form of a box-shaped member 40, closely fitting the interior of the orifice member 38. The open side of the box-shaped member 40 faces directly and encloses two tension springs 42 and 44. The lower end of each of the tension springs 42 and 44 is firmly attached, for example by welding, to an inner wall of the orifice member 38. The upper end of each of the tension springs is attached to the underside of the curtain 40. The effect of the tension springs 42 and 44 is to maintain the underside of the curtain 40 in contact with the upper surface of the spider leg 36. As the bellows expand with the volume of the fluid in which the device is housed, the spider leg 36 lifts the curtain 40 to block a portion of the orifice apertures which are indicated as the openings 45. Conversely, as the volume of the fluid decreases, the bellows contracts, and the tension springs 42 and 44 pull the curtain member 40 down, enlarging the opening presented by the orifice 45.

Figure 4:
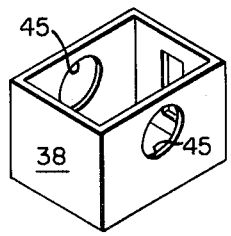
FIGS. 4 and 5 are perspective views of typical orifice members.
Figure 5:
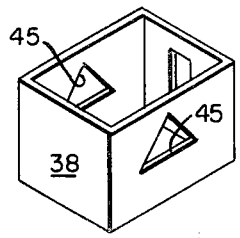

As was noted above, any desired function of damping may be achieved by varying the geometric shape of the openings 45. In FIG. 4, an alternative opening is shown, in this case circular apertures 45. In FIG. 5, another possible alternative is shown, namely triangular apertures 45. These shapes are merely illustrative, and numerous other alternatives are possible, depending upon the desired damping function. Obviously, the resistance to the flow of the damping fluid may be made to closely match the coefficient of expansion of the fluid, or various non-linear damping effects may be had by a suitable selection of fluid and orifice shape. Alternatively, the openings 45 may be made of any desired fixed shape, and the contour of the member 40 may be varied to provide a desired function. Still another possibility is the enlargement of the spider legs in order that they may serve as curtains by and of themselves. In such circumstances, the size and shape of the orifice member 38 may be varied to provide a suitable fit between the interior dimensions of the orifice member and the dimensions of the spider leg.

The foregoing and other alternatives will suggest themselves to those skilled in the art upon a reading of the specification herein. For that reason, the invention should not be limited to the details described and suggested, but only by the spirit and scope of the appended claims.

What is claimed is:

1. In apparatus for providing predetermined damping of an instrument contained in a housing, said instrument having at least a rotatable component immersed in a fluid which substantially fills said housing, the combination of a generally annular passage formed within said housing, a plurality of vanes attached to said rotatable component, said vanes being disposed in said annular passage, a like plurality of aperture members disposed in said passage, each said aperture member being disposed between two of said vanes, said aperture members including a fixed element having an aperture of predetermined geometric configuration formed therethrough and a movable element arranged adjacent said fixed element and slidable relative thereto to mask said aperture, a bellows forming a portion of said housing and having at least a portion thereof movable in response to volumetric changes in said fluid, means connected to said portion of said bellows and extending to said movable elements of said apertures, and spring means biasing said movable elements against said means connected to said portion of said bellows, whereby said movable elements mask portions of said apertures to reduce the effective area of said passage as a predetermined function of said volumetric changes in said fluid.

2. Damping apparatus for a gyroscope having a rotatable component and immersed in a fluid which substantially fills the housing of said gyroscope comprising a bellows forming part of said housing and having at least a portion thereof responsive in motion to volumetric changes in said fluid, a plurality of vanes attached to said rotatable component, an annular passage formed in said housing, said passage being defined in part by a web member having openings formed therein through which said vanes extend, a like plurality of fixed elements disposed within said passage and having apertures of predetermined geometric configuration formed therethrough, each of said fixed elements being disposed between two of said vanes, a like plurality of movable elements disposed adjacent said fixed elements and slidable relative thereto to mask said apertures, tension springs connected between said fixed elements and said movable elements biasing said movable elements in a direction maintaining said apertures unmasked, and a spider member having a hub and a plurality of extensions, said hub being attached to the movable portion of said bellows, each of said extensions bearing against said movable elements, whereby said movable elements mask portions of said apertures varying as a predetermined function of said volumetric changes of said fluid.

References Cited by the Examiner
UNITED STATES PATENTS

| | | | |
|---|---|---|---|
| 2,025,423 | 12/1935 | Robbins | 74—5.5 |
| 2,834,213 | 5/1958 | Fredericks | 74—5.5 |
| 2,955,472 | 10/1960 | Krupick et al. | 74—5.5 |

BROUGHTON G. DURHAM, *Primary Examiner.*